UNITED STATES PATENT OFFICE.

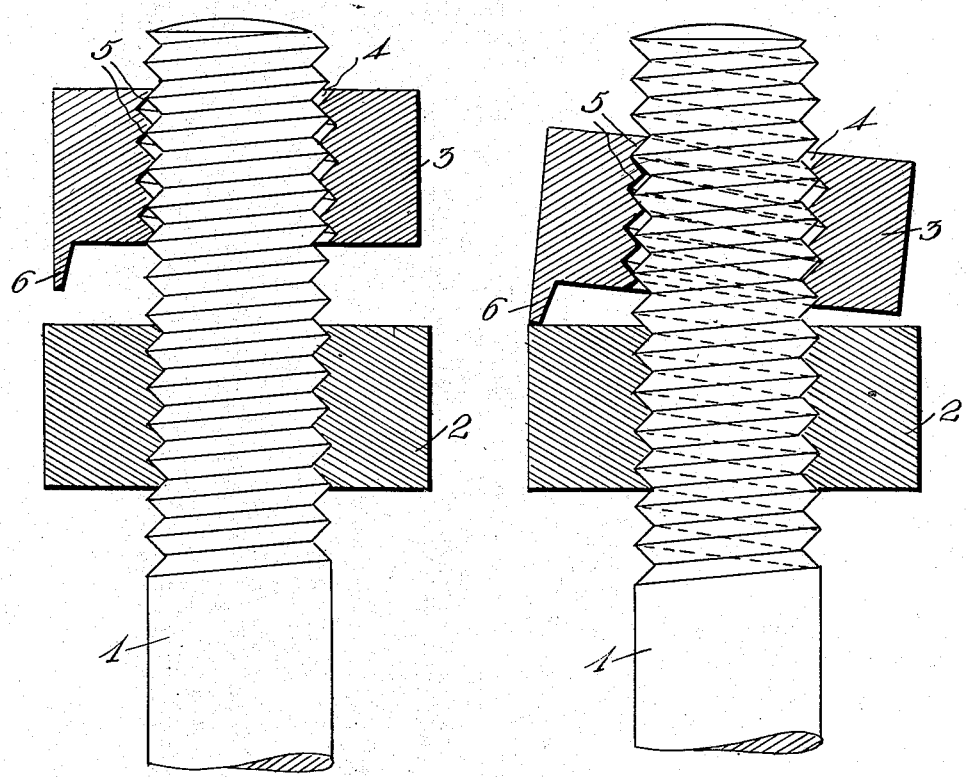

FRANK C. TAMBLING, OF SEATTLE, WASHINGTON, ASSIGNOR OF ONE-THIRD TO ELSIE G. SMILEY, OF STEVENS POINT, WISCONSIN.

NUT-LOCK.

No. 900,796.     Specification of Letters Patent.     Patented Oct. 13, 1908.

Application filed September 26, 1907. Serial No. 394,719.

*To all whom it may concern:*

Be it known that I, FRANK C. TAMBLING, a citizen of the United States, residing at Seattle, in the county of King and State of Washington, have invented certain new and useful Improvements in Nut-Locks; and I do declare the following to be a full, clear, and exact description of the invention, such as will enable others skilled in the art to which it appertains to make and use the same.

This invention has relation to new and useful improvements in nut locks, and has for its object to provide a simple and inexpensive nut lock that may be readily and easily applied in position without the aid of a wrench, and which, when in position on the bolt will lock the nut securely against reverse rotation.

In the accompanying drawings,—Figure 1 is a central longitudinal sectional view of a lock nut partly screwed on the bolt; Fig. 2 is a similar view, the lock nut in locking position; and Fig. 3 is an enlarged detail perspective view of the lock nut.

In the accompanying drawings, which are for illustrative purposes only, and therefore, are not drawn to any particular scale, 1 indicates a bolt of ordinary construction, and 2 a nut of ordinary construction in position thereon. 3 indicates the improved locking nut.

In carrying out the invention, the threaded aperture 4 of the lock nut is made of slightly greater diameter than the aperture of the nut 2 and of the diameter of the bolt on which it is to be used, so that the thread 5 of the lock nut will loosely engage the thread of the bolt body when screwed thereon, the purpose of which will be disclosed. Said lock nut is provided on its inner face and at one side edge with an inwardly projecting engaging portion or tooth 6, adapted to bite or engage the other face of the nut 2.

In practice, the locking nut is screwed on the bolt body until its engaging portion or tooth bites or engages the nut 2 or a fish plate or other stationary object through which the bolt 1 is passed, which operation causes the lock nut to be turned at an angle relative to the bolt nut, and its threads to cross and bite into those of the bolt body, locking the nut securely in position on the bolt.

Having described my invention, I claim:—

1. A lock nut of the character specified having a threaded aperture of greater diameter than the aperture of the bolt nut, and an engaging portion or tooth formed on its inner face, designed to engage the outer face of the bolt nut, the engagement between the bolt body and lock nut threads being sufficiently loose to cause the threads of the latter to cross and bite into those of the bolt body, when screwed into locking position.

2. A lock nut of the character specified, having a threaded aperture of greater diameter than the aperture of the bolt nut and having formed at one edge of its inner face a projecting portion or tooth arranged to engage the outer face of bolt nut, the engagement between the bolt body and lock nut threads being sufficiently loose to cause the threads of the latter to cross and bite into those of the former, when the lock nut is screwed into locking position, said operation resulting in the mutilation of the engaging portions of the bolt body and lock nut threads, whereby the latter is locked against removal.

3. A lock nut of the character specified having a threaded aperture of greater diameter than the aperture of the bolt nut and an engaging portion or tooth arranged to engage the outer face of the bolt nut, the engagement between the bolt body and lock nut threads being sufficiently loose to cause those of the latter to cross and bite into those of the former when the latter is screwed into locking position.

4. A locking nut having a threaded aperture of greater diameter than the diameter of the threaded portion of the bolt on which it is to be used and provided on its inner face with a projection.

5. A locking nut having a threaded aperture of greater diameter than the diameter of the threaded portion of the bolt on which it is to be used and provided on its inner face near one edge with a projection for engaging a stationary member and causing the threads of the nut to engage those of the bolt at an angle thereto and to bite thereinto.

In testimony whereof I have hereunto set my hand in presence of two subscribing witnesses.

FRANK C. TAMBLING.

Witnesses:
  FRANK ELIOT,
  JOHN E. PHELPS.